Nov. 5, 1968  R. RASMUSSEN  3,409,154
LOADING AND UNLOADING DEVICE
Filed Feb. 8, 1967  2 Sheets-Sheet 1

INVENTOR.
REED RASMUSSEN
BY
C. Harris
HIS ATTORNEY

Nov. 5, 1968

R. RASMUSSEN 3,409,154

LOADING AND UNLOADING DEVICE

Filed Feb. 8, 1967

INVENTOR.
REED RASMUSSEN
BY C. Haum
HIS ATTORNEY

United States Patent Office 3,409,154
Patented Nov. 5, 1968

3,409,154
LOADING AND UNLOADING DEVICE
Reed Rasmussen, 168 W. Gentile,
Layton City, Utah 84041
Filed Feb. 8, 1967, Ser. No. 614,662
9 Claims. (Cl. 214—515)

ABSTRACT OF THE DISCLOSURE

A camper loading and unloading device having sprockets, journaled to the rear end of a truck bed, positioned to coact with racks secured to the bottom of the camper along each of the opposite sides of the camper, and means for driving the sprockets individually and simultaneously. Guides may be secured to the device for aligning the racks with the sprockets and for locking the camper to the bed.

---

This invention relates to an improved apparatus for moving a transportable object from ground level onto the bed of a traction vehicle such as a pick-up truck, or alternatively, from the vehicle to the ground or other fixed point, and in particular, to an improved apparatus for loading and unloading a transportable object which does not require the use of cables or other winch systems In my United States Patent No. 3,229,839, a device for loading and unloading transportable objects from traction vehicles is described which utilizes cables and winch drums in conjunction with sprockets. While the apparatus described in this patent has proved to be entirely effective for loading and unloading transportable objects such as camper bodies from pick-up trucks, it is complicated in its construction and is often difficult to operate. In particular, problems have arisen in properly wrapping the cables on the helically grooved winch drums thereby preventing the camper from sliding easily onto the bed of the pick-up truck. Also, if the cables are loose the camper may fall several inches onto the cables when it reaches the end of the truck bed as it is being unloaded. A still further problem is encountered when the camper is loaded onto the bed of the truck. If the camper and truck are not properly aligned, the camper binds against the truck as it is loaded.

Accordingly, a principal object of the present invention is to provide a new and improved system for moving transportable objects from ground level to the bed of a traction vehicle.

A further object of this invention is to provide a loading and unloading device which overcomes the aforementioned problems and disadvantages inherent in the previously used loading and unloading devices.

A still further object of this invention is to provide an improved loading and unloading system which does not require the use of cables and winches.

Still further objects of my invention will become apparent to those skilled in the art as the invention is better understood by reference to the detailed description appearing hereinafter.

According to my inventiton, the foregoing objects and attendant advantages may be achieved by providing a loading and unloading device in combination with a traction vehicle having a bed and a transportable object constructed for removable placement on said bed. The loading and unloading device uses sprockets journaled to the opposite sides of the bed of the traction vehicle. Rack means secured to and supporting said transportable object are positioned to engage the sprockets. The sprockets are provided with drive means for selectively imparting rotation to any predetermined sprockets and for simultaneously driving each of the sprockets. Legs are deposed proximate the rear portion and front portion of the transportable object for supporting the object at the approximate elevation of the bed of said traction vehicle. The length of the front legs can be varied, e.g., lengthened and shortened, so that the front portion of the transportable object can be lowered onto the bed of the traction vehicle or raised therefrom.

So that the invention can be more readily understood and carried into effect, reference is to the accompanying drawings which are offered by way of example only and are not to be taken as limiting the invention, the scope of which is defined by the appended claims, which obviously embrace equivalent structures and processes.

Figure 1:
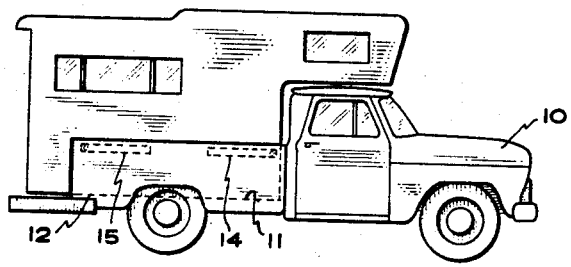
FIG. 1 is a side elevation view of a traction vehicle having a transportable object such as a camper or coach mounted on the vehicle bed.
Figure 2:
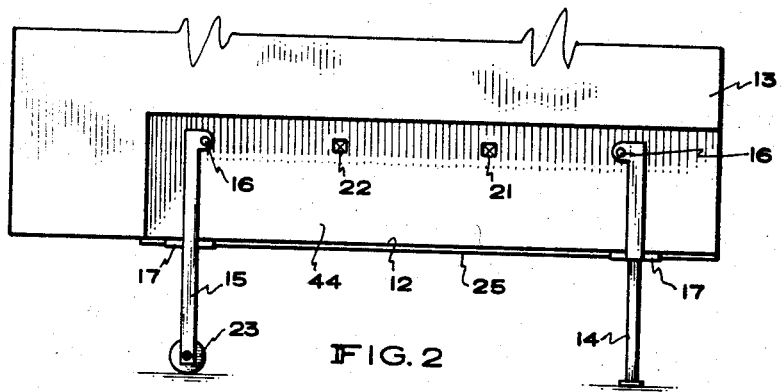
FIG. 2 is a side elevation view of the lower portion of the camper of FIG. 1 showing the camper supported by legs.

Referring now more particularly to the drawings, FIGURE 1 shows a traction vehicle 10 provided with bed 11 which supports bottom 12 of transportable object 13, such as a camper. Transportable object 13 is shown to be in transportable position being supported by bed 12 of vehicle 10 and ready for travel. For purpose of simplification throughout the following description, the transportable object will be referred to as a camper. In FIGURE 2, camper 13 is supported on front legs 14, and rear legs 15. Said legs are secured to camper 13 by upper attaching means 16 and bottom plate 17 in a conventional fashion. When camper 13 is in a transportable position as shown in FIGURE 1, said legs 14 and 15 are rotated to a horizontal position.

Figure 3:
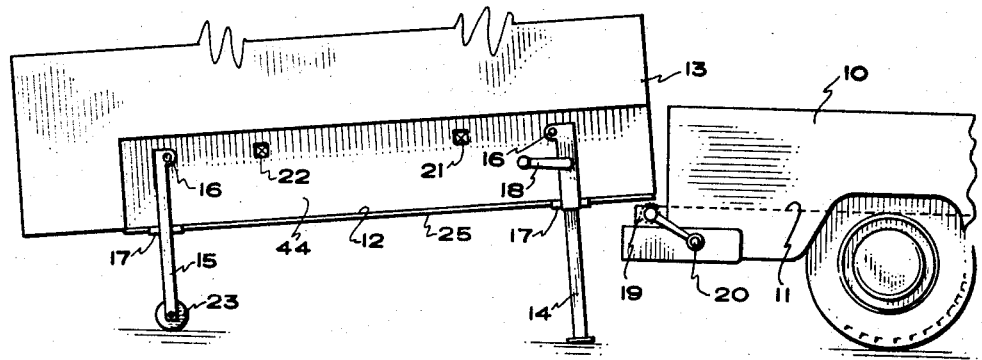
FIG. 3 is a side elevation view of the camper shown in FIG. 2 in loading relationship with the bed of a pick-up truck.

FIGURE 3 shows camper 13 positioned so that it can be loaded onto bed 11 of vehicle 10. Front legs 14 of camper 13 have been extended to raise said camper so that its bottom 12 is at a position elevated above bed 11. In loading the camper, front legs 14 are shortened by rotating crank 18 until the front of said camper 13 contacts camper loader means 19 of this invention, hereinafter described in detail. Crank 20 is then rotated which drives loading means 19 thereby drawing the camper onto the truck bed. Front legs 14 are then rotated to a horizontal position and attached to connector 21 and thereafter camper 13 is further drawn onto bed 11 until said camper 13 is entirely supported by the bed. At this time rear legs 15 are rotated to a horizontal position and attached to connector 22. Rear legs 14 are generally provided with slides or rollers such as wheels 23 so that camper 13 can be drawn towards truck 10.

Figure 5:
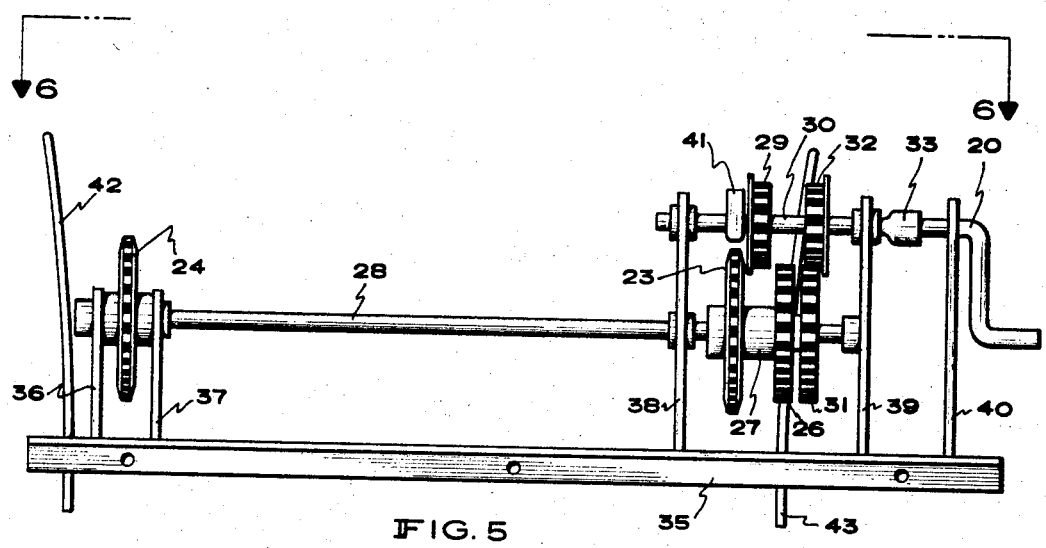
FIG. 5 is a bottom view of the preferred sprocket driving means of my invention.
Figure 6:
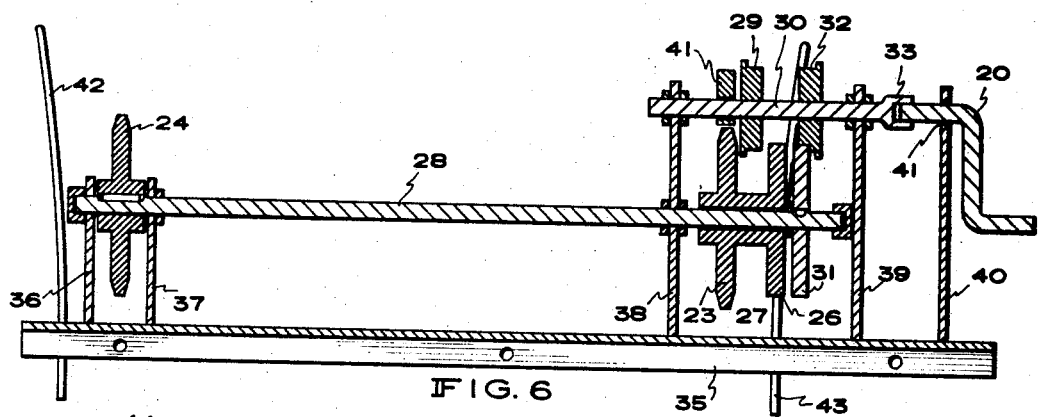
FIG. 6 is a sectional view of the sprocket driving means of FIG. 5 taken along the plane of line 6—6.

Referring now more particularly to driving means 19, as shown in FIGURES 5 and 6, sprocket 23 is secured to gear 26 with spacing member 27, all of which are rotatably mounted on shaft 28. Gear 26 is adapted to coact with drive gear 29 which is keyed to shaft 30 and slidably mounted thereon. Accordingly, when drive gear 29 is placed in driving relationship with gear 26 and is driven, sprocket 23 rotates on shaft 28. Sprocket 24 is keyed to one end of shaft 28 and gear 31 is keyed to the shaft's other end. Gear 31 coacts with drive gear 32 keyed to and slidably mounted on shaft 30, and accordingly, sprocket 24 is driven when shaft 30 is rotated. Shaft 30 is provided with adapter 33 sized to receive crank 34 used to drive said shaft 30. Shaft 28 is secured to mounting bracket 35 with supports 36, 37, 38, and 39. Drive gears 29 and 32 are held in their proper position with respect to gears 26 and 31 with support members 38 and 39. Shafts 28 and 30 are journaled in said supports with conventional bearing means. Support member 40 is secured to mounting bracket 35 and is used to support crank 20 which is passed through the port in said support. Pawl 41 is rotatably mounted on shaft 30 and is adapted to coact with sprocket 23 to prevent said sprocket 23 from rotating and therein act as a lock. The loader is attached to bed 11 of vehicle 10 by bolting mounting bracket 35 to said bed 11 proximate its rear end.

In operation, sprocket 23 and sprocket 24 can be rotated either individually or simultaneously. To rotate sprocket 23 individually, drive gear 29 is slid on shaft 30 into driving contact with gear 26 and drive gear 32 is slid out of driving contact with gear 31. Shaft 30 is then rotated by turning crank 20 to rotate drive gear 29, which drives gear 26 and sprocket 23. To rotate sprocket 24 without turning sprocket 23, drive gear 32 is slid into driving contact with gear 31 and drive gear 29 is slid out of contact with gear 26. Obviously sprockets 23 and 24 can be rotated simultaneously by merely sliding drive gears 29 and 30 into driving position with gears 26 and 31 and thereafter rotating shaft 30.

Figure 4:
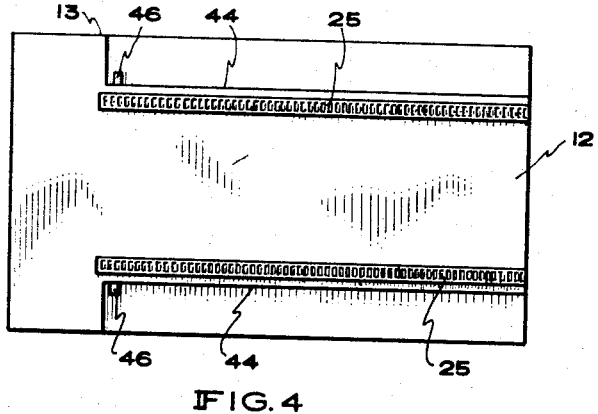
FIG. 4 is the bottom view of a camper showing the racks and locking devices for supporting the camper on the bed of a truck.
Figure 7:
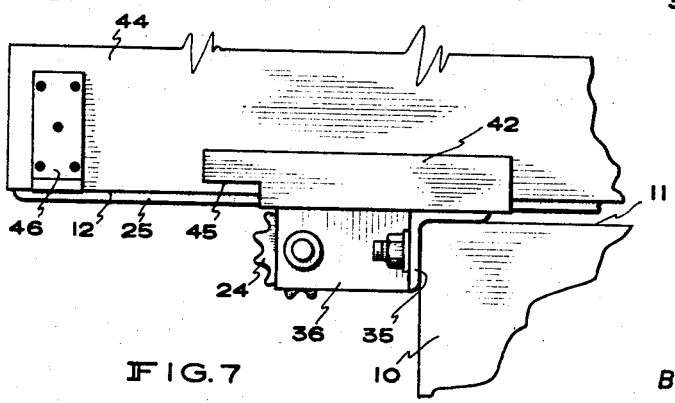
FIG. 7 is an enlarged detail view of the sprocket driving means mounted to the rear of a traction vehicle having a camper mounted thereon.

The loading and unloading device of my invention may also be provided with guides 42 and 43 which are used to guide camper 13 onto bed 11 of vehicle 10 so that racks 25, secured to the bottom 12 of the camper and preferably along the opposite side edges of said bottom, more readily contact sprocket 23 and 24. The guides are fixedly connected to mounting bracket 34 and are spaced apart from each other so that the sidewalls 44 of camper 13 slide between them. Said guides are preferably positioned at an angle with the center line of vehicle 10 so that the back end of said guides point inwardly towards the center area of bed 11. In this fashion, racks 25 are pushed into line with sprockets 23 and 24 as camper 13 moves onto bed 11 of said vehicle 10. The guides are also used to lock the camper to the bed when it has been loaded onto said bed. As shown in FIGURES 4 and 7, L-shaped tie down members 46 are secured to the opposite sides 44 of camper 13 which members slide under notch 45 of guides 42 and 43 to lock camper 13 in a transportable position.

When using the loading and unloading device of this invention the camper need not be parallel with the longitudinal axis of vehicle 10 as it is loaded and unloaded. As previously described, vehicle 10 is positioned so that when the camper is lowered onto bed 11, sprockets 23 and 24, positioned on opposite sides of the camper bottom, contact racks 25. Said sprockets 23 and 24 are then rotated, and if necessary, they can be rotated individually to pull camper 13 into a proper loading relationship with vehicle 10. For example, when camper 13 moves onto bed 11 at an angle rather than parallel with the longitudinal axis of the vehicle, the sprocket which is on the side of the camper which is the most advanced towards the front of the bed is disengaged and the opposite sprocket is rotated to pull the lagging side of the camper into the bed.

It will be understood throughout the foregoing description and in the claims that the term "sprocket" refers not only to conventional sprockets but also to other types of gearing such as spur gears, pinions, etc. The term "rack" includes not only conventional tooth gear racks but also perforated straps and equivalent elongated structures. The term "keyed" refers to tying, fixing, gearing, or otherwise intercoupling respective parts together for mutual revolvement.

Whereas there is here illustrated and particularly described a certain preferred construction which is presently regarded as the best mode of carrying out the invention, it should be understood that various changes may be made and other construction adopted without departing from the inventive subject matter particularly pointed out and claimed.

I claim:

1. In combination with a traction vehicle having a bed and a transportable object constructed for removable placement on said bed, a device for loading and unloading said transportable object having first and second sprockets transversely spaced and journaled to said bed of the vehicle proximate said vehicle's rear end; rack means secured to the bottom of said transportable object and positioned to selectively engage said sprockets to be translated thereby; and first drive means secured to said vehicle for individually driving said first sprocket means and second drive means secured to said vehicle for individually driving said second sprocket means whereby the transportable object in the unloading position can be aligned with the vehicle bed for loading by the individual operation of the first and second sprocket means with the rack means.

2. The combination of claim 1 wherein means are provided for connecting said first drive means and said second drive means to simultaneously drive said first and said second sprockets.

3. The combination of claim 1 wherein said first and said second sprockets are journaled to frame means connected to the bed of said vehicle proximate its rear end.

4. The combination of claim 3 wherein means are provided for connecting said first drive means and said second drive means to simultaneously drive said first and said second sprockets.

5. The combination of claim 4 wherein guide means are secured to said frame means for guiding said racks into coacting relationship with said sprockets as the transportable object is translated on the bed of said traction vehicle.

6. The combination of claim 5 wherein lock means are secured to said frame for preventing rotation of at least one of said sprockets when said lock means is moved to a locking position.

7. The combination of claim 5 wherein tie down members are secured to said transportable object which coact with said guide means when said object is in a transportable position to tie said object to the bed of said vehicle.

8. The combination of claim 4 wherein leg means are mounted to said transportable object proximate its rear end for supporting said object as it is loaded on said bed.

9. The combination of claim 8 wherein expandable leg means are secured to said transportable object proximate the front end of said object for supporting said front end of said object at a predetermined elevation.

References Cited

UNITED STATES PATENTS 2,352,129    6/1944    Shonnard _____ 214—516 X
3,221,913    12/1965    Chamberlain _____ 214—517

ALBERT J. MAKAY, *Primary Examiner.*